(12) United States Patent
Kim

(10) Patent No.: US 7,078,956 B1
(45) Date of Patent: Jul. 18, 2006

(54) CHARGE PUMP CIRCUIT

(75) Inventor: Joo Young Kim, Seoul (KR)

(73) Assignee: Hyundai Electronics Industries Co, Ltd., Kyungki-Do (KR)

( * ) Notice: Subject to any disclaimer, the term of this patent is extended or adjusted under 35 U.S.C. 154(b) by 0 days.

(21) Appl. No.: 08/576,902

(22) Filed: Dec. 22, 1995

(30) Foreign Application Priority Data

Dec. 27, 1994  (KR) ............................... 1994-37306

(51) Int. Cl.
 *G05F 3/02* (2006.01)
(52) U.S. Cl. ........................... 327/536; 327/537
(58) Field of Classification Search ........... 327/536, 327/537, 589; 307/49
 See application file for complete search history.

(56) References Cited

U.S. PATENT DOCUMENTS

| | | | | |
|---|---|---|---|---|
| 5,029,063 A | * | 7/1991 | Lingstaedt et al. ........... 363/60 |
| 5,029,282 A | * | 7/1991 | Ito ............................... 327/537 |
| 5,095,223 A | * | 3/1992 | Thomas ....................... 307/110 |
| 5,140,182 A | * | 8/1992 | Ichimura ..................... 327/536 |
| 5,237,209 A | | 8/1993 | Brewer ........................ 307/110 |
| 5,414,614 A | * | 5/1995 | Fette et al. ................... 363/59 |
| 5,422,590 A | | 6/1995 | Coffman et al. ............ 327/537 |
| 5,587,680 A | * | 12/1996 | Smith .......................... 327/291 |
| 5,589,793 A | * | 12/1996 | Kassapian ................... 327/536 |
| 5,644,534 A | * | 7/1997 | Soejima ................. 365/185.23 |

FOREIGN PATENT DOCUMENTS

| | | |
|---|---|---|
| GB | 1364618 | 8/1974 |
| GB | 2 245 112 A | 12/1991 |

* cited by examiner

*Primary Examiner*—Terry D. Cunningham
(74) *Attorney, Agent, or Firm*—Mayer, Brown, Rowe & Maw LLP

(57) ABSTRACT

A charge pump circuit is disclosed which can perform high pumping by changing the condition of connection of the charge pump circuit by connecting a serial and parallel switching circuit and a level shift circuit between unit charge pumps to construct the charge pump circuit.

9 Claims, 5 Drawing Sheets

FIG. 6A
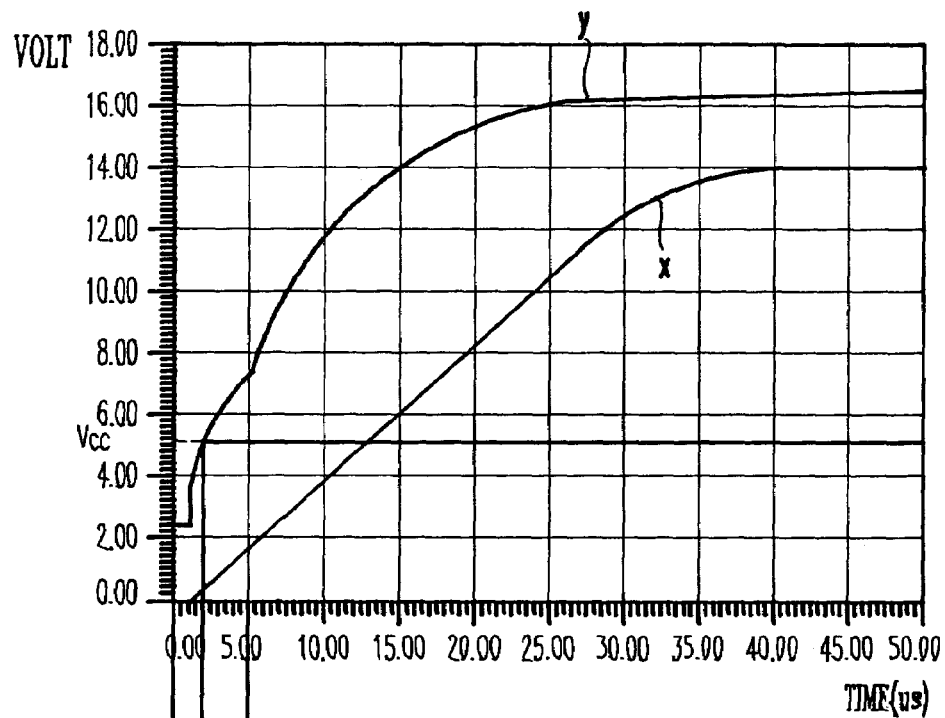
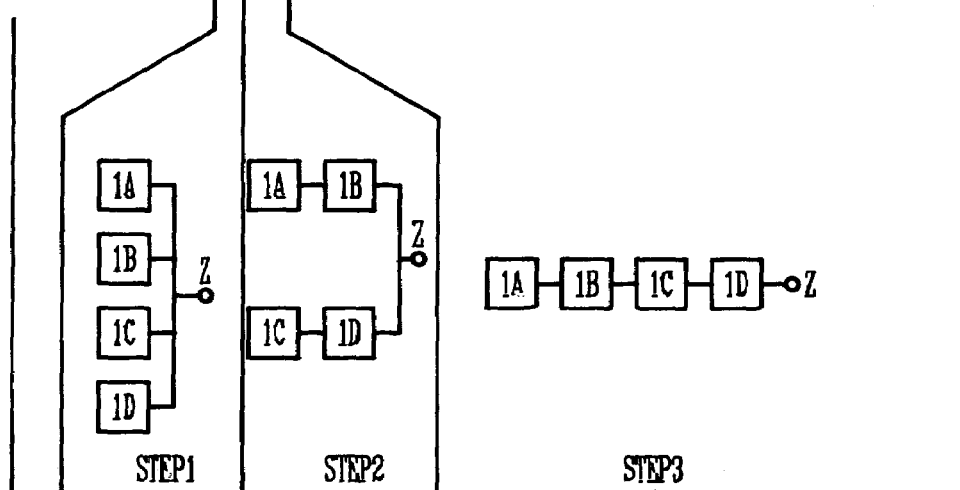
FIG. 6B

CHARGE PUMP CIRCUIT

BACKGROUND OF INVENTION

Field of Invention

The present invention relates to a charge pump circuit and, more particularly, a charge pump circuit which can reduce pumping time.

Information Disclosure Statement

As shown in FIG. 1, in a conventional charge pump circuit, a plurality of unit charge pump circuits 1A, 1B, 1C and 1D are connected in series between a supply power source VDD and an output terminal Z. Therefore, the supply power source VDD is charged up at each unit charge pump 1A, 1B, 1C and 1D in accordance with a two(2)-phase clock signals; Φ, $\overline{Φ}$ and transferred to the output terminal Z.

FIG. 2 is an equivalent circuit for illustration of FIG. 1. As shown in FIG. 2, each unit charge pump 1A, 1B, 1C and 1D comprises a capacitor C and a diode D for charge pumping. Such unit charge pumps 1A, 1B, 1C and 1D are connected in series between the supply power source VDD and an output terminal Z. The supply power source VDD is charged up at each unit charge pump 1A, 1B, 1C and 1D in accordance with the two(2)-phase clock signals Φ, $\overline{Φ}$ and transferred to the output terminal Z through a diode Dz. CL denotes a load capacitor in both FIGS. 1 and 2.

However, such conventional charge pump circuit has a disadvantage in that a consumption power is high and a charge transfer efficiency at initial operation is lowered since the unit charge pumps are connected in series between the supply power source and the output terminal.

SUMMARY OF THE INVENTION

An object of the invention is to provide a charge pump circuit which can solve the above advantage by connecting switching circuit connected between unit charge pumps and by controlling the switching circuit with a level shift circuit.

To achieve the above object, a charge pump circuit according to the present invention, comprises: a first unit charge pump connected to a supply power source and performing a pumping operation according to clock signals; a second unit charge pump connected to the supply power source and performing a pumping operation according to the clock signals; and a switching circuit for selectively transferring an output of the first unit charge pump to an input or output of the second unit charge pump according to a control signal.

BRIEF DESCRIPTION OF THE DRAWINGS

For fuller understanding of the nature and objects of the invention, reference should be had to the following detailed description taken in conjunction with the accompanying drawings in which:

FIGS. 4A through 4C are equivalent circuits for illustration of FIG. 3;

FIG. 6A is a graph for comparing an output of the conventional charge pump circuit and an output of the charge pump circuit of the present invention; and FIG. 6B is a schematic diagram for illustration of FIG. 6A.

Similar reference characters refer to similar parts through the several views of the drawings.

DETAILED DESCRIPTION OF THE INVENTION

A detailed description of an embodiment of the present invention is given below with reference to the accompanying drawings.

Figure 3:
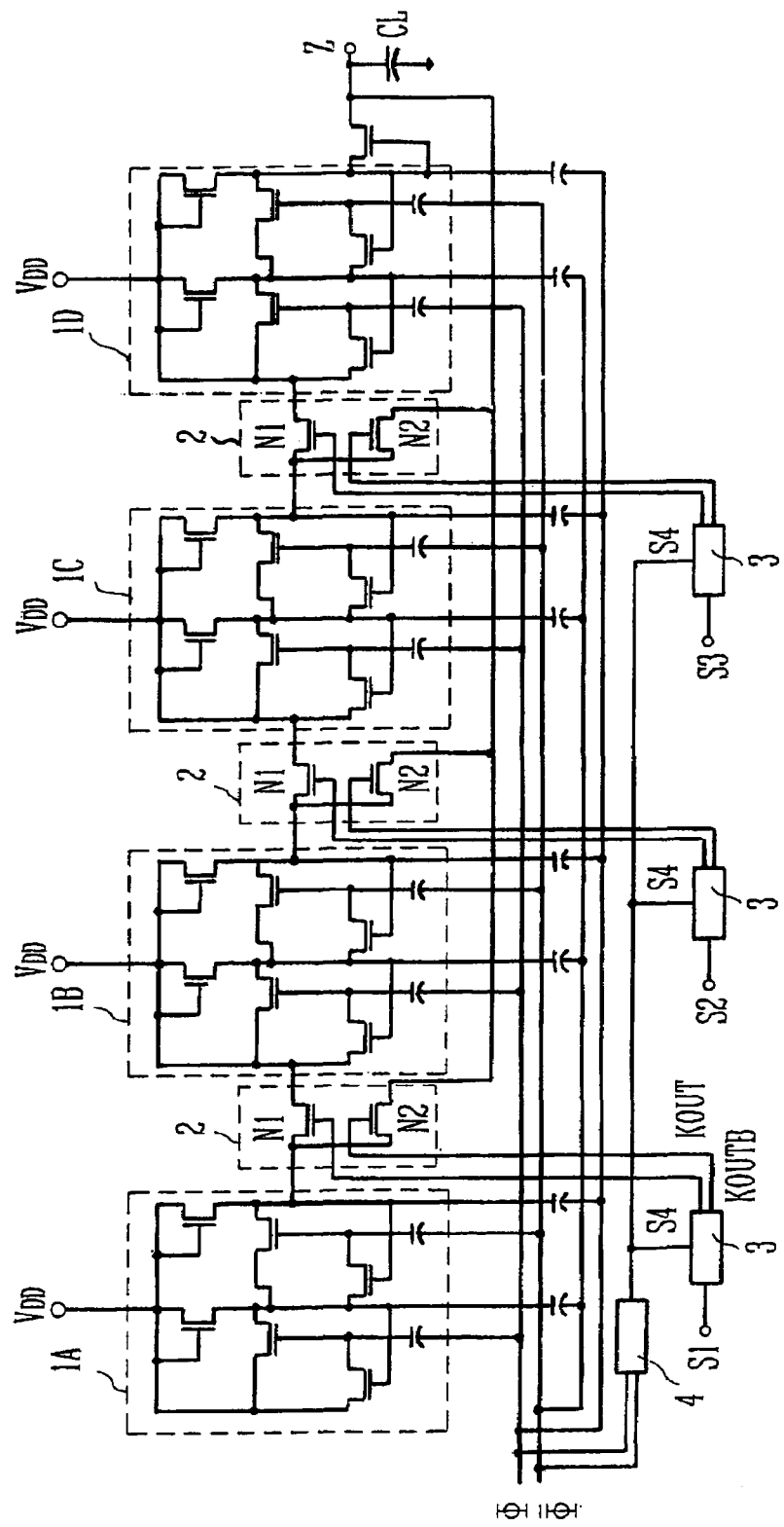
FIG. 3 is a charge pump circuit of the present invention.

FIG. 3 is a charge pump circuit of the present invention. Circuits of first, second, third and fourth unit charge pumps 1A, 1B, 1C and 1D which are supplied an operating voltage from the supply power source VDD, respectively, are identical to the circuit of FIG. 1. A switching circuit 2 is provided between the first and second unit charge pumps 1A and 1B. An input terminal of the switching circuit 2 is connected to an output terminal of the first unit charge pump 1A. An output terminal of the switching circuit 2 is connected to an input terminal of the second unit charge pump 1b and an output terminal Z respectively. Each switching circuit 2 is also connected between the second and third unit charge pumps 1B and 1C and connected between the third and fourth unit charge pumps 1C and 1D, and also connected to the output terminal Z. The switching circuit 2 has two transistors N1 and N2. The transistor N1 is connected. The transistor N2 is connected to the output terminal of the first unit charge pump 1A and the output terminal Z. The transistor N1 and N2 connected between the second and third unit charge pumps 1B and 1C, and the transistor N1 and N2 connected between the third and fourth unit charge pumps 1C and 1D are connected in the same way as the transistor N1 and N2 connected between the first and second unit charge pumps 1A and 1B.

The switching circuit 2 is controlled by output signals of a level shift circuit 3. That is, the transistors N1 and N2 are turned on or off according to outputs the output signals KOUT and KOUTB of the level shift circuit 3. The level shift circuit 3 produces output signal KOUT and KOUTB according to each control signal S1, S2 or S3 and an output signal S4 of an auxiliary charge pump circuit 4 which is operated according to the two(2)-phase clock signals Φ, $\overline{Φ}$. The reference number CL denotes a load capacitor. If the transistors N1 are turned on and the transistors N2 are turned off, the first through fourth unit charge pumps 1A through 1D are connected in cascade. To the contrary, if the transistors N1 are turned off and the transistors N2 are turned on, the output terminals of the first through fourth unit charge pumps 1A through 1D are connected to the output terminal Z.

FIGS. 4A, 4B and 4C are equivalent circuits for illustration of FIG. 3. FIG. 4A can be regarded as an equivalent circuit of FIG. 3 in the condition that all the transistors N1 are turned off and all the transistors N2 are turned on. Therefore, the supply power source VDD is transferred to the output terminal Z through a diode D and Dz. The resultant capacitance is 4C.

FIG. 4C can be regarded as an equivalent circuit of FIG. 3 in the condition that all the transistors N1 are turned on and all the transistors N2 are turned off. The first through fourth unit charge pumps 1A through 1D are transformed into diodes D. The resultant capacitance is C/4. The capacitance is reduced in the condition of FIG. 4A. The supply power source VDD is transferred to the output terminal Z through the diodes D and Dz. The capacitor CL is a load capacitor.

FIG. 4B can be regarded as an equivalent circuit of FIG. 3 in the condition that the transistor N1 is turned on and the transistor N2 is turned off between the first and second charge pumps 1A and 1B, the transistor N1 is turned on and the transistor N2 is turned off between the third and fourth unit charge pumps 1C and 1D, and the transistor N1 is turned off and the transistor N2 is turned on between the second and third unit charge pumps 1B and 1C.

Figure 5:
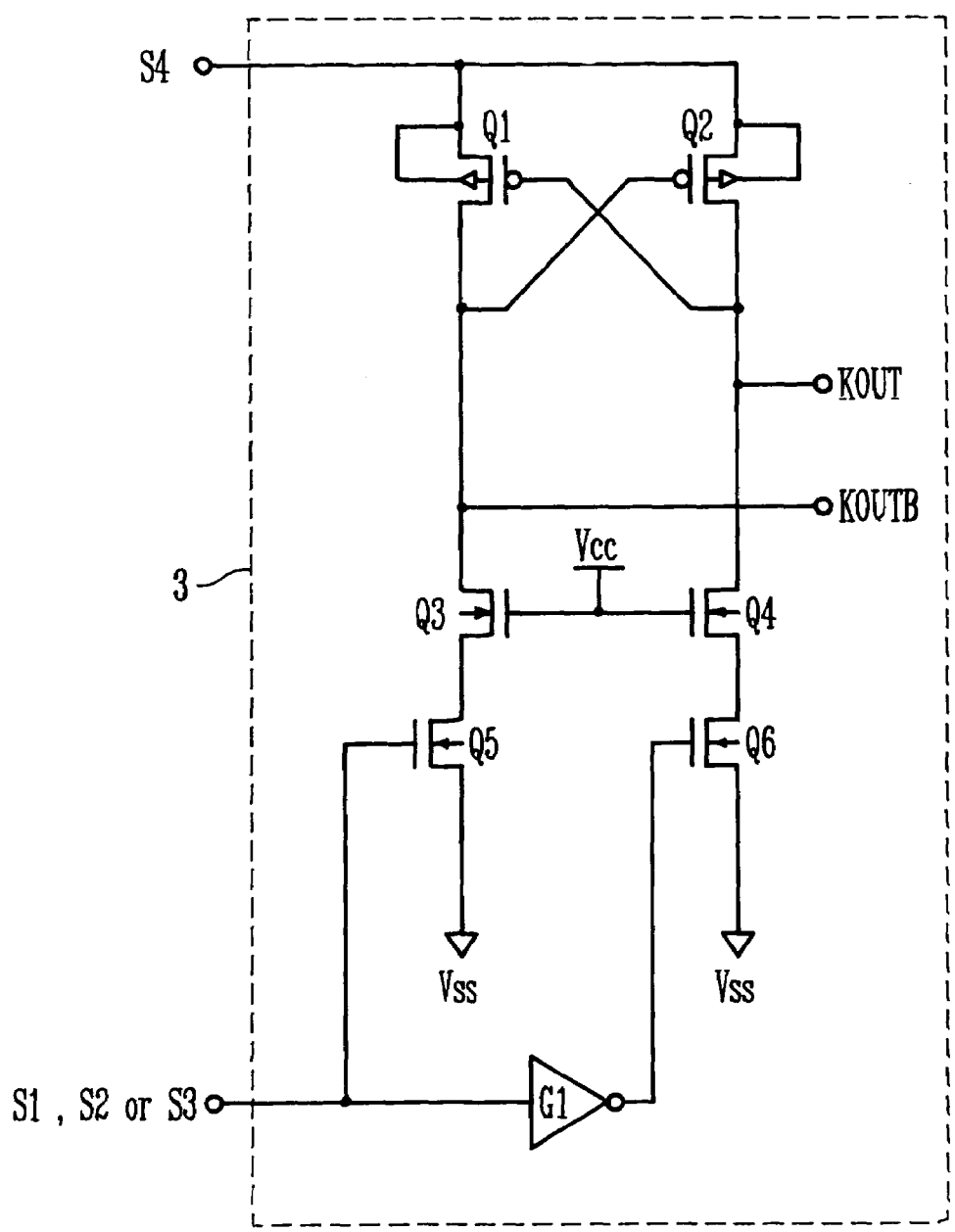
FIG. 5 is a detailed circuit of a level shift circuit of FIG. 3.

FIG. 5 is a detailed circuit diagram of the level shift circuit of FIG. 3. The output signals KOUT and KOUTB which are inverted from each other are generated according to an output signal S4 of the auxiliary charge pump circuit 4 and control signals S1, S2 and S3. The output signal S4 of the auxiliary charge pump circuit 4 is maintained to be in a high voltage condition. Therefore, if the control signal S1, S2 or S3 is "HIGH", the output of an invert gate G1 becomes "LOW", whereby a transistor Q6 is turned off and a transistor Q5 is turned on. At this time, since transistors Q3 and Q4 are in the condition of turn on, a transistor Q2 is turned on while a transistor Q1 is turned off. Therefore, the output KOUT signal becomes "HIGH" and the output KOUTB signal becomes "LOW".

FIG. 6A is a graph for comparing an output(X) of the conventional charge pump circuit and an output(Y) of the charge pump circuit of the present invention.

As shown in FIG. 6A, the conventional charge pump circuit takes much time to rise up to VCC voltage since charge pumping starts at a voltage far lower than VCC voltage.

Figure 1:
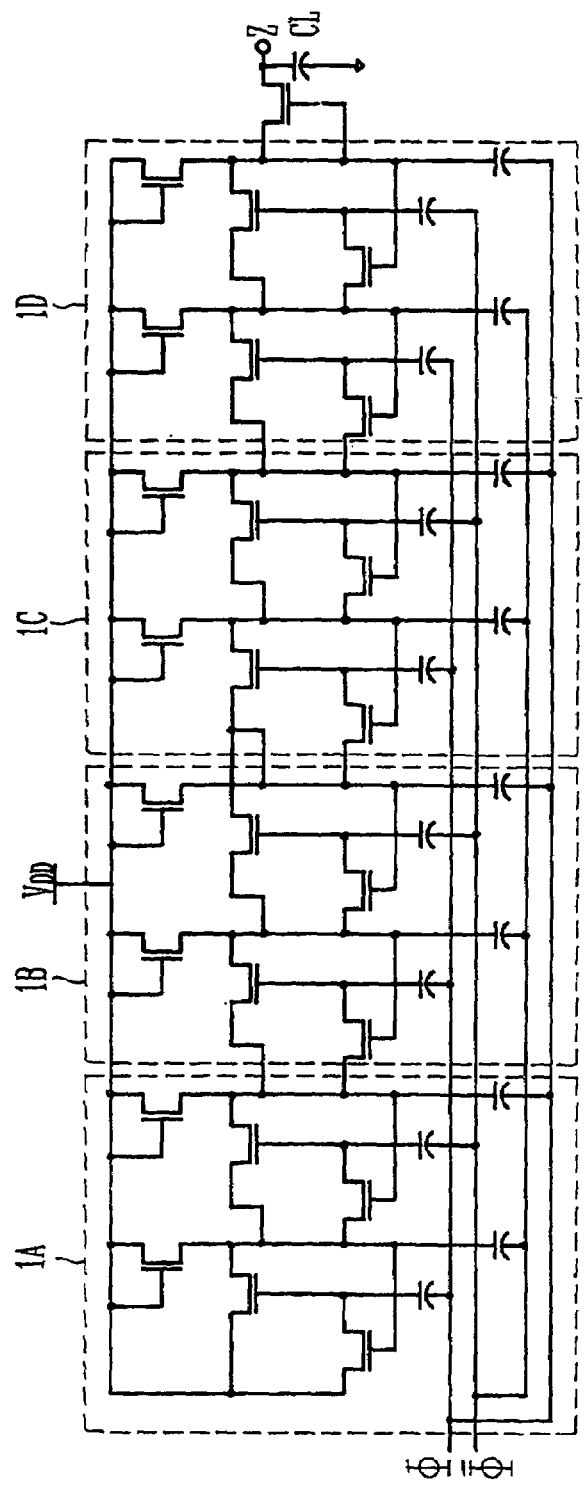
FIG. 1 shows a conventional charge pump circuit.
Figure 2:
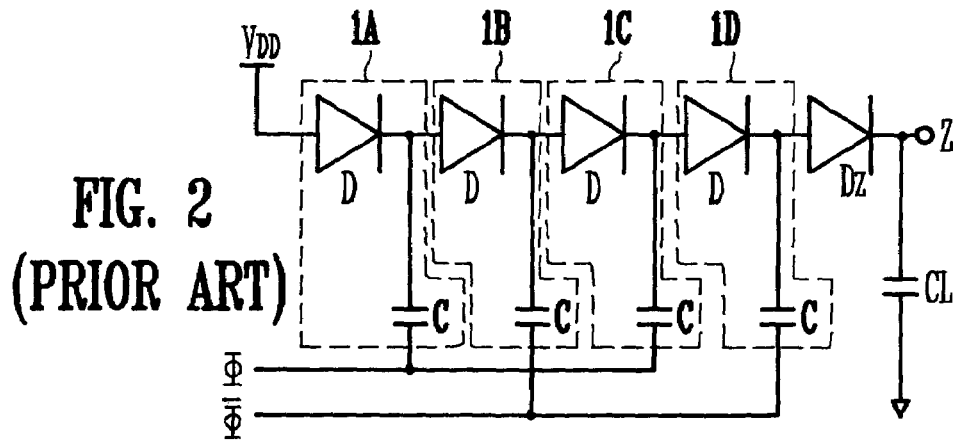
FIG. 2 is an equivalent circuit for illustration of FIG. 1.

However, as shown in FIG. 6B, the present invention increases the capacitance since the first through fourth unit charge pumps 1A through 1D are connected in parallel to the output terminal Z at the beginning (STEP 1) of pumping operation, and decreases the capacitance since the first and second unit charge pumps 1A and 1B and the third and fourth unit charge pumps 1C and 1D are connected in cascade, respectively, and the output terminals of the second and fourth unit charge pumps 1B and 1D are connected to the output terminal Z as shown in step 2. At the final step (STEP 3), the first through fourth unit charge pumps 1A through 1D are connected in cascade as shown in FIG. 1. Therefore, as shown in FIG. 6A, since the pumping operation starts at about 2.2V, the pumping time is reduced as well as the power consumption is reduced.

As described above, the present invention has an excellent effect that the charge transfer efficiency is increased at the initial operation of the charge pump circuit as well as the programming time can be reduced at the time of programming flash memory devices utilizing high voltage.

The foregoing description, although described in its preferred embodiment with a certain degree of particularity, is only illustrative of the principle of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What is claimed is:

1. A charge pump circuit comprising:
   a supply power source;
   a first unit charge pump, supplied with an operating voltage from said supply power source, operating to perform a pumping operation according to clock signals;
   a second unit charge pump, supplied with an operating voltage from said supply power source, operating to perform a pumping operation according to said clock signals;
   at least one switching circuit electrically connected between said first and second unit charge pumps, operating to selectively transfer an output of said first unit charge pump to an input terminal or output terminal of said second unit charge pump according to control signals;
   an auxiliary pumping circuit, operating to generate an output signal according to said clock signals; and
   a level shift circuit coupled between said switching circuit and said auxiliary pumping circuit, wherein said level shift circuit generates said control signals according to said output signal of said auxiliary pumping circuit and another control signal.

2. A charge pump circuit as claimed in claim 1, wherein said switching circuit comprises a first switching means for connecting an output terminal of said first unit charge pump to said input terminal of said second charge pump, and a second switching means for connecting said output terminal of said first unit charge pump to said output terminal of said second unit charge pump.

3. A charge pump circuit comprising:
   a power supply power source;
   a first unit charge pump, supplied with an operating voltage from said supply power source, operating to performed a pumping operation according to clock signals;
   a second unit charge pump, supplied with an operating voltage from said supply power source, operating to perform a pumping operation according to said clock signals;
   at least one switching circuit electrically connected between said first and second unit charge pumps, operating to selectively transfer an output of said first unit charge pump to an input terminal or an output terminal of said second unit charge pump according to control signals;
   an auxiliary pumping circuit to generate an output signal according to said clock signals; and
   a level shift circuit electrically coupled between said switching circuit and said auxiliary pumping circuit, said level shift circuit operating to generate said control signals which are inverted with respect to each other according to said output signal of said auxiliary pumping circuit and another control signal.

4. A charge pump circuit, comprising:
   a supply power source;
   a first unit charge pump, supplied with an operating voltage from said supply power, operating to perform a pumping operation according to clock signals;
   a second unit charge pump, supplied with the operating voltage from said supply power source and operating to perform a pumping operation according to said clock signals;
   a switching circuit, electrically connected to said first and second unit charge pumps and configured to selectively transfer an output of said first unit charge pump to an input terminal or an output terminal of said second unit charge pump according to two control signals;
   an auxiliary pumping circuit configured to generate an output signal according to said clock signals; and
   a level shift circuit coupled between said switching circuit and said auxiliary pumping circuit, operating to generate said control signals which are inverted relative to each other according to said output signal of said auxiliary pumping circuit and another control signal.

5. The circuit as in claim 4, wherein said switching circuit comprises a first switching means for connecting an output terminal of said first unit charge pump to said input terminal of said second unit charge pump, and a second switching means for connecting said output terminal of said first unit charge pump to said output terminal of said second unit charge pump.

6. A charge pump circuit, comprising:
a supply power source;
a first unit charge pump, supplied with an operating voltage from said supply power source and performing a first pumping operation according to clock signals:
a second unit charge pump, supplied with an operating voltage from said supply power source and performing a second pumping operation according to said clock signals;
a first switching circuit for selectively transferring an output of said first unit charge pump to an input terminal or output terminal of said second unit charge pump according to first control signals;
a third unit charge pump, supplied with an operating voltage from said supply power source and performing a third pumping operation according to said clock signals;
a second switching circuit for selectively transferring an output of said second unit charge pump to an input terminal or output terminal of said third unit charge pump according to second control signals;
a fourth unit charge pump, supplied with an operating voltage from said supply power source and performing a fourth pumping operation according to said clock signals;
a third switching circuit for selectively transferring an output of said third unit charge pump to an input terminal or output terminal of said fourth unit charge pump according to third control signals;
an auxiliary pumping circuit to generate an output signal according to said clock signals:

a first level shift circuit coupled between said first switching circuit and said auxiliary pumping circuit, operating to generate said first control signals according to said output signal of said auxiliary pumping circuit and a fourth control signal:

a second level shift circuit coupled between said second switching circuit and said auxiliary pumping circuit, operating to generate said second control signals according to said output signal of said auxiliary pumping circuit and a fifth control signal; and a third level shift circuit coupled between said third switching circuit and said auxiliary pumping circuit, operating to generate said third control signals according to said output signal of said auxiliary pumping circuit and a sixth control signal.

7. A circuit as claimed in claim 6, wherein said switching circuit comprises a first switching means for connecting an output terminal of said first unit charge pump to said input terminal of said second charge pump, and a second switching means for connecting said output terminal of said first unit charge pump to said output terminal of said second unit charge pump.

8. A circuit as claimed in claim 6, wherein said second switching circuit comprises a first switching means for connecting said output terminal of said second unit charge pump to said input terminal of said third charge pump, and a second switching means for connecting said output terminal of said second unit charge pump to said output terminal of said third unit charge pump.

9. A circuit as claimed in claim 6, wherein said third switching circuit comprises a first switching means for connecting said output terminal of said third unit charge pump to said input terminal of said fourth charge pump, and a second switching means for connecting said output terminal of said third unit charge pump to said output terminal of said fourth unit charge pump.

* * * * *